A. McKIBBIN.
VALVE.
APPLICATION FILED JULY 18, 1918.

1,345,382.

Patented July 6, 1920.
2 SHEETS—SHEET 1.

Witnesses
C. F. Peterson
Charles W. Hill Jr.

Inventor
ALEXANDER McKIBBIN.
by Charles W. Hill Atty.

A. McKIBBIN.
VALVE.
APPLICATION FILED JULY 18, 1918.
1,345,382.
Patented July 6, 1920.
2 SHEETS—SHEET 2.
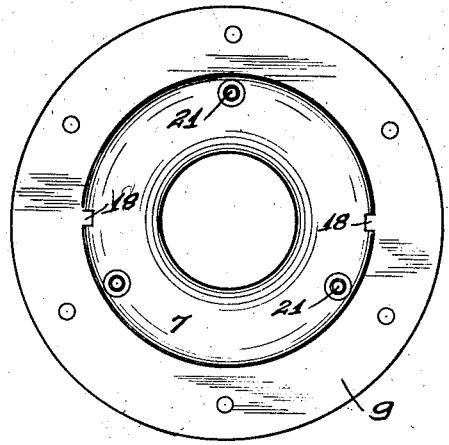
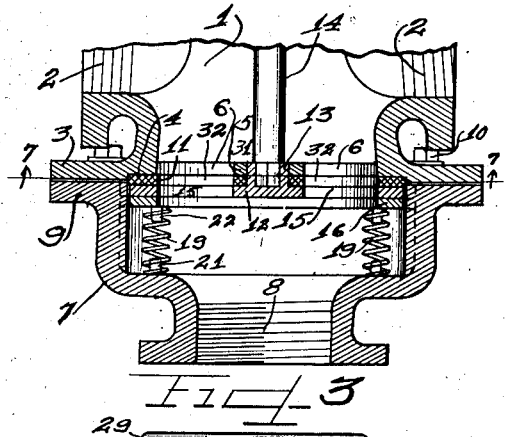
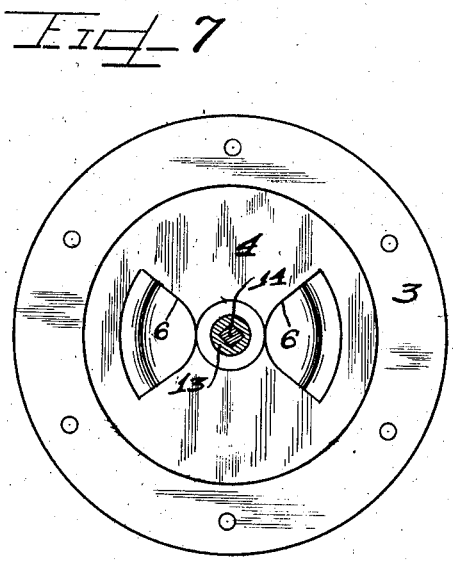
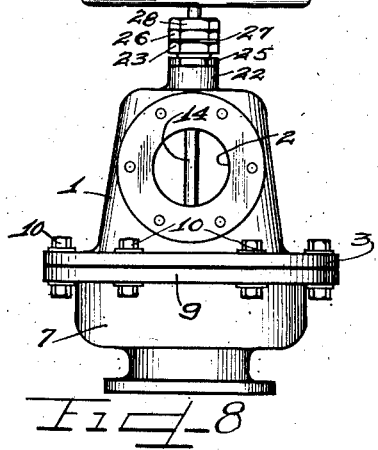
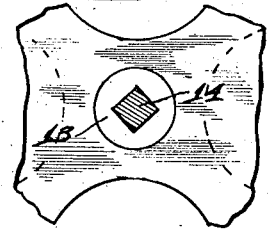
Witnesses
C. F. Peterson
Inventor
ALEXANDER McKIBBIN
By Charles W. Hill Atty.

UNITED STATES PATENT OFFICE.

ALEXANDER McKIBBIN, OF CHICAGO, ILLINOIS.

VALVE.

1,345,382.　　　　　Specification of Letters Patent.　　Patented July 6, 1920.

Application filed July 18, 1918. Serial No. 245,516.

*To all whom it may concern:*

Be it known that I, ALEXANDER MCKIBBIN, a citizen of the United States, and a resident of the city of Chicago, in the county of Cook and State of Illinois, have invented certain new and useful Improvements in Valves; and I do hereby declare that the following is a full, clear, and exact description of the same, reference being had to the accompanying drawings, and to the numerals of reference marked thereon, which form a part of this specification.

My invention has reference more particularly to a disk valve, wherein a plate is operable from the exterior of the valve casing to slide across the valve opening or openings and thereby control the flow of fluid therethrough.

It is an object of my invention to provide a valve which is simple in construction and has improved means for controlling the flow of fluid therethrough.

Another object of my invention is to provide a valve having a perforated plate and a valve disk movable relatively thereto, and a packing disk likewise perforated and held between the plate and valve disk under pressure to maintain a fluid tight joint.

Another object of my invention is to provide improved means for packing the valve stem to avoid leakage, wherein the packing means is adjustable without straining the valve.

My invention also has other important objects which will appear from the following specification and the accompanying drawings, in which I have described and shown my invention in a preferred form.

On the drawings:

Fig. 3 is another side view looking at either the right or left hand side of Fig. 1.

Fig. 5 is a fragmentary view of parts shown in Fig. 4, showing the valve open.

Fig. 7 is a sectional view on the line 7—7 of Fig. 5.

Fig. 8 is an enlarged sectional view on the line 8—8 of Fig. 4.

Fig. 9 is an inside view of the cup-shaped cap which closes the bottom of the valve casing.

As shown on the drawings:

Figure 4:
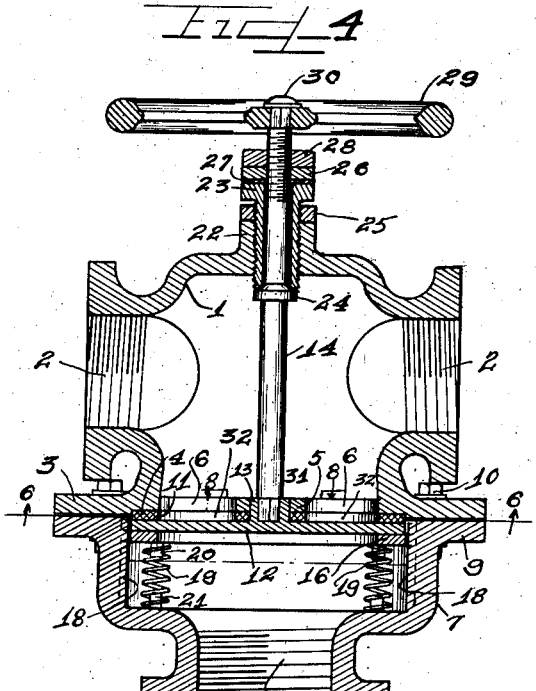
Fig. 4 is an enlarged sectional view on the line 4—4 of Fig. 1, showing the valve closed.

The reference numeral 1 indicates the valve casing, which has a pair of outlet branch openings 2, and an opening 31 at one side of the casing intermediate of the branch openings, which latter opening is surrounded by a flange 3, and has a shallow annular seat or recess 4, at the inner edge of the flange. A partition or plate 5, which may be made integral with the casing 1, or otherwise as desired, is located in the opening 31, and has the outer surface thereof flush with the base of the seat or groove 4, and this plate is centrally perforated and also has a pair of diametrically opposite openings 6, which are adapted to afford a passageway for the fluid into the interior of the valve casing 1. A cup-shaped cap 7, which has an internal diameter somewhat greater than the diameter of the opening 31, is attached to the casing 1 and has a threaded inlet opening 8, thereto, to which the inlet pipe is connected, also has a flange 9, whereby the cap is secured to the flange 3 of the casing 1, by means of the bolts 10.

Figure 6:
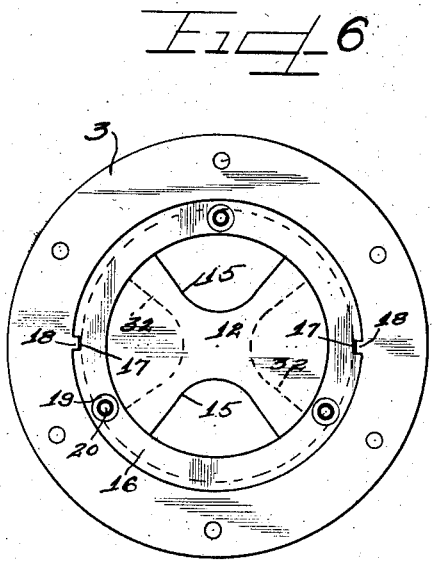
Fig. 6 is a sectional view on the line 6—6 of Fig. 4.
Figure 2:
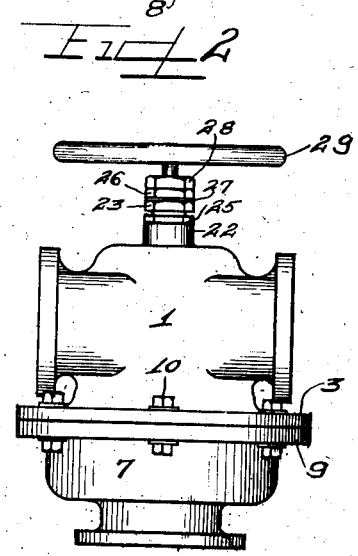
Fig. 2 is a side view thereof looking at the bottom of Fig. 1.
Figure 1:
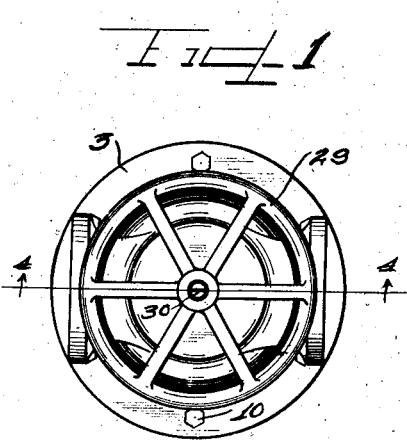
Figure 1 is a top view of a valve embodying my invention.

The groove 4, is of substantially the same diameter as the interior of the cap 7, and has a disk 11, of packing material seated therein and held so as to remain stationary, and this disk has a central perforation matching the central perforation of the partition 5, and also has openings 32, therethrough, which match the openings 6, of the plate 5. A valve disk 12, of approximately the same diameter as the disk 11, is held thereagainst and has a hub 13, which extends through the central perforations of the packing disk 11 and partition 5, and has a square socket in the hub which is adapted to admit the square end of the stem 14, whereby the valve disk is operated. This valve disk 12, is also provided with a pair of diametrically opposite openings 15, of the same form and size as the openings 6 and 32, in the partition 5 and the disk 11, respectively, which, by turning the plate 12, may be made to register with the latter mentioned openings to afford passage of fluid through the valve, and may also be moved so that the solid portion of the disk 12, covers the openings 6 and 32, and interrupts communication therethrough, the openings being so arranged that when the valve is closed the edges of the openings are overlapped to a considerable extent as shown in Fig. 6, so as to insure a tight closure.

The valve 12, is adapted to be held tight against the packing disk 11, by the pressure of the fluid entering through the inlet opening 8, and in addition is provided with means for positively holding the valve parts in close engagement. This means comprises a ring 16, which is fitted in the chamber of the casing 7, so as to move to and from the valve, and is held against turning by means of a pair of diametrically opposite notches 17, in the periphery thereof, which engage a pair of ribs 18, on the inner wall of the casing 7, and there are a plurality of springs 19, compressed between the under surface of the ring 16, and the wall of the casing 7, the said ring and wall being provided with the projecting pins 20 and 21, respectively, for holding the springs in the proper position. The ring 16, thus bears against the under surface of the valve disk 12, and by reason of the tension of the springs 19, holds the valve in tight engagement with the packing ring 11, and insures a tight joint.

The stem 14, as hereinbefore stated, is provided with a square inner end, which engages the square socket in the hub 13, or any other suitable connection may be made which will insure turning of the valve disk 12, with the stem 14, and will permit relative movement of the stem 14, to and from the valve disk, and this stem 14, projects through the wall of the casing at the opposite side thereof from the valve 12, the said wall being provided with an internally threaded nipple 22, through which the stem 14, extends. There is a bushing 23, on the stem 14, and threaded into the nipple 22, and said bushing has the inner end thereof beveled inwardly so as to have a wedge-like engagement with a beveled face of the annular flange 24, with which the stem 14, is provided and effect a tight joint. A lock nut 25, on the bushing 23, is turned down against the outer end of the nipple 22, to hold the bushing 23, securely in the position to which it is adjusted.

For holding the annular flange 24, of the stem tight against the inner end of the bushing 23, without tension on the valve disk 12, the outer end of the stem 14, is threaded and has the nut 26, turned thereon against a packing disk 27, which latter bears against the outer end of the bushing 23, and draws the annular flange 24, of the stem tight against the inner end of the bushing 23, to effect a tight joint. A lock nut 28, is threaded on the stem 14, against the nut 26, to hold the latter in the position to which it is adjusted.

Any convenient means may be provided at the outer end of the stem 14, for turning the stem and valve disk 12, such as the hand wheel 29, which engages the squared outer end of the stem 14, and is held thereon by means of the cap screw 30.

The operation is as follows:

This valve may be used for controlling the supply of steam, water or other fluid and has the inlet pipe connected with the inlet opening 8, of the valve and the outlet pipe connected with the outlet opening 2, and the pressure of the fluid coöperates with the springs 19, to maintain a pressure on the under surface of the valve disk 12, to hold same against the packing disk 11, and thereby insures an engagement, the effectiveness of which increases with the pressure of the fluid and insures a tight closing valve under all conditions. To open the valve it is only necessary to turn the stem 14, a quarter turn and the valve may therefore be opened and closed quickly and at the same time may be easily regulated or adjusted at intermediate points to permit any desired flow of fluid through the valve.

It will be noted that by reason of the loose connection of the inner end of the stem 14, with the valve disk 12, assembling of the valve is not only facilitated but adjustment of the stem 14, to secure the desired engagement of the bushing 23, with the annular flange 24, of the stem to effect tight joint is permitted without effecting a strain on the valve disk 12, which might otherwise prevent improper seating of the valve.

While I have shown and described my invention in a preferred form, I am aware that various changes and modifications may be made therein without departing from the principles of my invention, and I therefore do not purpose limiting the patent granted hereon otherwise than necessitated by the prior art.

I claim as my invention:

1. The combination of a valve casing having an inlet and an outlet, and a perforated partition between the inlet and outlet, a packing disk bearing against the partition and having perforations adapted to register with the perforations of the partition, a valve disk provided with perforations therein and having means at the exterior of the casing for operating the valve disk to control the passage of fluid through the perforations, a ring engaging the valve disk, means for resiliently pressing the ring against the valve disk so as to maintain the packing disk between the partition and the valve disk under sufficient pressure to effect a tight joint.

2. The combination of a valve casing having an inlet and an outlet, and a perforated partition between the inlet and outlet, a packing disk bearing against the partition and having perforations adapted to register with the perforations of the partition, a valve disk provided with perforations therein and having means at the exterior of the casing for operating the valve disk to control the passage of fluid through the perforations, a ring engaging the valve disk and held thereagainst by means of a plurality of springs so as to maintain the packing disk between the partition and the valve disk under sufficient pressure to effect a tight joint.

3. The combination of a valve casing having an inlet and an outlet opening, a flange around the inlet opening, a cup-shaped centrally apertured cap secured to the flange, a perforated partition intermediate of the casing and the cap, a valve disk having means at the exterior of the casing for actuating the valve disk to regulate the passage of fluid through the perforations of the partition, and resilient means seated in the outer portions of cup-shaped cap and bearing against the valve disk.

4. The combination of a valve casing having an inlet and an outlet, and a perforated partition between the inlet and the outlet, a packing disk bearing against the partition and having perforations adapted to register with the perforations of the partition, a valve disk provided with perforations therein and having means at the exterior of the casing loosely but non-revolubly connected to the valve disk to rotate the latter for controlling the passage of fluid through the perforations, a ring engaging the valve disk, means for resiliently pressing the ring against the valve disk so as to maintain the packing disk between the partition and the valve disk under sufficient pressure to effect a tight joint.

In testimony whereof I have hereunto subscribed my name in the presence of two subscribing witnesses.

ALEXANDER McKIBBIN.

Witnesses:
CHARLES W. HILLS, Jr.,
EARL M. HARDINE.